(12) United States Patent
Christiansen et al.

(10) Patent No.: US 10,729,100 B2
(45) Date of Patent: Aug. 4, 2020

(54) METHOD FOR RECORDING AND PREDICTING POSITION DATA FOR A SELF-PROPELLED WHEELED VEHICLE

(71) Applicant: Minkpapir A/S, Holstebro (DK)

(72) Inventors: Martin Peter Christiansen, Hasselager (DK); Rasmus Nyholm Jorgensen, Horsens (DK)

(73) Assignee: MINKPAPIR A/S (DK)

( * ) Notice: Subject to any disclaimer, the term of this patent is extended or adjusted under 35 U.S.C. 154(b) by 436 days.

(21) Appl. No.: 15/537,208

(22) PCT Filed: Dec. 14, 2015

(86) PCT No.: PCT/DK2015/050393
§ 371 (c)(1),
(2) Date: Jun. 16, 2017

(87) PCT Pub. No.: WO2016/095921
PCT Pub. Date: Jun. 23, 2016

(65) Prior Publication Data
US 2017/0347624 A1    Dec. 7, 2017

(30) Foreign Application Priority Data
Dec. 19, 2014   (DK) .................................. 2014 70803

(51) Int. Cl.
*A01K 5/02* (2006.01)
*G05D 1/02* (2020.01)
*G08G 1/017* (2006.01)

(52) U.S. Cl.
CPC .......... *A01K 5/0266* (2013.01); *G05D 1/027* (2013.01); *G05D 1/0261* (2013.01);
(Continued)

(58) Field of Classification Search
CPC ........ A01K 5/02; A01K 5/0266; G05D 1/027; G05D 1/0261; G05D 1/0272
See application file for complete search history.

(56) References Cited

U.S. PATENT DOCUMENTS

| | | | |
|---|---|---|---|
| 1,885,023 | A | 10/1932 | Dieckmann |
| 4,238,829 | A | 12/1980 | Martin |

(Continued)

FOREIGN PATENT DOCUMENTS

| | | | | |
|---|---|---|---|---|
| CA | 2843302 A1 | * | 8/2014 | ............. A01K 5/004 |
| CA | 2956520 A1 | * | 2/2016 | ............. A01K 1/105 |

(Continued)

*Primary Examiner* — Monica L Barlow
*Assistant Examiner* — Aaron M Rodziwicz
(74) *Attorney, Agent, or Firm* — Ware, Fressola, Maguire & Barber LLP

(57) ABSTRACT

A method for recording and predicting position data for a self-propelled wheeled vehicle (1) carrying a load (14) is provided whereby the vehicle (1) is caused to move along a ground surface (5) along a predominantly straight line trajectory (17) by rotating at least one load carrying wheel (3) in frictional engagement with the surface (5), angular rotation data of at least one wheel (3) is obtained, absolute position data are obtained at different predetermined fixed positions $P_n$ of the vehicle (1) with respect to the surface (5) along the straight line trajectory (17), whereby the distance travels is measured independently and used to calibrate motion sensors on board the vehicle. The invention also comprises a delivery or pick up system, a program for an on-board computing device and an on-board computing device.

9 Claims, 7 Drawing Sheets

(52) U.S. Cl.
CPC ........... *G05D 1/0272* (2013.01); *G08G 1/017* (2013.01); *G05D 2201/0216* (2013.01)

(56) References Cited

U.S. PATENT DOCUMENTS

| | | | |
|---|---|---|---|
| 4,658,373 A | 4/1987 | Murakami | |
| 5,483,455 A | 1/1996 | Lay | |
| 6,377,888 B1 | 4/2002 | Olch | |
| 6,750,769 B1 | 6/2004 | Smith | |
| 7,648,329 B2 | 1/2010 | Chilson | |
| 7,916,022 B2 | 3/2011 | Wilcox | |
| 8,319,955 B2 | 11/2012 | Mika | |
| 8,400,270 B2 | 3/2013 | Brand | |
| 8,587,455 B2 | 11/2013 | Porte | |
| 2004/0181320 A1* | 9/2004 | Kane | B61L 25/021 701/19 |
| 2005/0099302 A1 | 5/2005 | Lieffort | |
| 2007/0260371 A1* | 11/2007 | Young | G05D 1/0242 701/25 |
| 2009/0267741 A1 | 10/2009 | Li | |
| 2010/0230183 A1* | 9/2010 | Van Den Berg | A01K 1/105 180/6.48 |
| 2013/0152862 A1 | 6/2013 | Zobbe | |
| 2015/0149050 A1* | 5/2015 | Palsgaard | A01K 5/00 701/50 |
| 2015/0250137 A1* | 9/2015 | Palsgaard | A01K 5/00 119/57.92 |

FOREIGN PATENT DOCUMENTS

| | | | |
|---|---|---|---|
| CN | 102004893 | 4/2011 | |
| DE | 10 2006 004 400 | 8/2007 | |
| DE | 10 2006 004 938 | 8/2007 | |
| DK | 177425 | 2/2012 | |
| EP | 0 836 978 | 4/1998 | |
| WO | 98/35276 | 8/1998 | |
| WO | WO-2008101500 A1 * | 8/2008 | ............... A01K 5/02 |
| WO | 2009/010421 | 1/2009 | |
| WO | 2010/068716 | 6/2010 | |
| WO | 2010/083977 | 7/2010 | |

* cited by examiner

METHOD FOR RECORDING AND PREDICTING POSITION DATA FOR A SELF-PROPELLED WHEELED VEHICLE

CROSS-REFERENCE TO RELATED APPLICATIONS

This application is a U.S. national stage of International Appl. No. PCT/DK2015/050393 filed 14 Dec. 2015, which claimed priority to Danish Appl. No. PA 2014 70803 filed 19 Dec. 2014, which applications are all incorporated herein by reference in their entireties.

TECHNICAL FIELD

The present invention relates to a method to online estimate vehicle and environment parameters, where the vehicle changes transporting load throughout the operational task. The invention relates particularly, but not exclusively, to automated load changing vehicle applications, that need vehicle and environment parameter estimates for operational purposes.

The invention may be used in areas such as:
Automated animal fodder distribution,
Vehicle mounted robots with position changing implements
Plant spraying/watering,
Robotic package and parcel transportation and delivery and/or garbage pickup at private households,
Robot assisted building such as brick or tile laying and painting,
Robot assisted manufacture of large items such as wind turbine blades.

BACKGROUND

Vehicles are utilized in a number of applications of the above sort to transport a load that is changing over time. Animal fodder distribution along lines of feeding places or at animal cages is an example of a load changing vehicle where on-board load is diminished until the fodder tank is empty. When the tank is refilled, a new load change takes place. The change in on-board load affects the amount of load on each wheel, effecting vehicle/tire parameters (and vehicle driving performance).

Automatically guided vehicles require some method of determining their location and system parameters so that they, over time, can achieve the desired positions and velocities. In a load changing setting the vehicle location can be used automatically to place part of the on-board load in the surrounding environment at the desired cartesian x,y,z coordinates. The vehicle guidance system and load placement system can be combined into a single system dependent on the same localization source.

Existing vehicle localization methods include the use of Global Navigation Satellite System (GNSS)/Global Position System (GPS); wheel rotary encoders; Inertial Measurement Unit (IMU)/Inertial Navigation Systems (INS); Ultra sound; Doppler radar; Differential radio triangulation, Laser triangulation; Laser range scanner; Camera vision; Tag/Landmark; and others. These methods (Sensors) all have individual shortcomings in terms of increased cost or demands to the conditions and environments the localization methods can be used.

The GPS/GNSS solutions demand a direct, clear signal path between receiver and satellite, making it mostly usable in open outdoor scenarios. Position location systems depending on line-of-sight can be effected by emitting light sources, heat, electromagnetic fields and field-of-view blocking structures. Systems based on IMU; wheels encoders and Doppler radar provides only relative localization coordinates, which needs to be referenced by a known location. Tag/landmark based solutions can be costly in the number of units needed to cover the desired area and is dependent on an accurate map of each tag/landmarks position.

Wheel rotary encoder (wheel odometry) provides a means to estimate vehicle change in position over time. Rotary encoders come in 2 main versions:
Incremental encoder, measures the changes in angle (rotation speed) by A/B pulse that need to be counted by a device (ex. micro-controller),
Absolute encoder measures the angle of the encoder and in some cases the number of rotations.

Both incremental and absolute encoders are used to measure the rotational speed of the vehicle wheels. To calculate the speed of the vehicle, a rough estimate can be based on $V=R*\omega$ Where V is vehicle speed, R is the wheel radius $\omega$ is the measured wheel rotational speed. Encoders on vehicle wheels can be used to estimate both speed V of the vehicle and rotational speed $\omega$ of the wheel.

Numerical integration of obtained rotational data from encoders at wheel shafts may be used to estimate the change in position. The vehicle speed estimates are dependent on a precise wheel radius R, slip free surface movement of the wheel, and an even surface. Any error in the wheel rotation measurement or deviation from the above dependency provides accumulative errors in the positioning estimate. The change in load can affect the tire parameter and result in over or under-estimation of current speed and position. Methods have been developed to compensate for these load changes but tends dependent on offline calibration based measurements of effect from current on-board load. The surface condition could also deviate from the expected flat even surface, and this may result in less reliable speed and position estimates.

Identification tags like Radio Frequency Identification (RFID) have been used for the last decade to provide local and global positioning information about a vehicle. The vehicle is equipped with an RFID reader with a known position in the vehicles own coordinate frame. RFID tags with known positions are placed along the vehicles path to provide fixed position corrections (landmarks). Using an a priori map of the RFID tags location, the vehicle is able to get absolute positioning estimates in relation to the surroundings. Positioning estimates from the RFID tags are provided to the vehicle, when the RFID reader is within the detection zone of each tag. Combining the RFID tag information with other on board positioning sensors like wheel encoders, IMU, laser scanner and/or Vision cameras the vehicle can continually update the position estimate. The distance between RFID tags is dependent on the demanded position accuracy and available data from other sensor sources.

Document CN102004893 discloses a vehicle positioning method based on radio frequency identification (RFID) self-calibration using a rotary encoder installed on a spindle of a vehicle driving motor to obtain the vehicle displacement information; using an RFID electronic tag installed on the vehicle track to calibrate the displacement information measured by the rotary encoder; selecting the weighting distribution coefficient according to the deviation range of the measurement coordinate value of the rotary encoder and the coordinate value of the RFID electronic tag and calibrating the dynamic deviation of the rotary encoder and the RFID electronic tag by the self-learning weighed least square method to reduce the measurement error of the rotary encoder caused by impact of the mechanical factors of the vehicle.

Other prior art documents in the field are:
U.S. Pat. No. 6,750,769 Method and apparatus for using RFID tags to determine the position of an object
WO2010068716A1 Method and system for determining a position of a vehicle
WO2010083977A2 Localization system for determining a position of a device that can be moved on the floor
U.S. Pat. No. 7,648,329 Automatic transport loading system and method
EP2376869A1 Method and system for determining a position of a vehicle
U.S. Pat. No. 6,377,888 System for controlling movement of a vehicle
U.S. Pat. No. 1,885,023 System for locating moving bodies
U.S. Pat. No. 5,483,455 Method and apparatus for determining the location of a vehicle
U.S. Pat. No. 4,658,373 Position detecting apparatus
DK177425B1 Method, feed cart and system for feeding of fur animals
WO2009010421A1 Device and method for determining a position and orientation
DE102006004938A1 Positioniersystem
U.S. Pat. No. 8,400,270B2 Systems and methods for determining an operating state using RFID
U.S. Pat. No. 8,587,455 Localisation of vehicle or mobile objects based on embedded RFID tags
U.S. Pat. No. 8,319,955 Device and method for determining a position and orientation
U.S. Pat. No. 7,916,022B2 Agricultural information gathering system US20090267741A1 RFID Floor Tags for Machine Localization and Delivery of Visual Information
DE102006004400A1 Navigation system, navigation device and method
US20050099302 System for detecting radio-frequency identification tags
U.S. Pat. No. 7,648,329B2 Automatic transport loading system and method
WO1998035276A1 Navigation system for automatic guided vehicle A simple and effective way of determining current vehicle position which is robust with respect to possible shifts in the load position and load size, and also with respect to changes in tire pressure and wear as well as changes in surface structure and quality is desired.

SUMMARY OF THE INVENTION

A method is provided for recording and predicting position data for a self-propelled wheeled vehicle carrying a load whereby the vehicle is caused to move along a ground surface (5) along a predominantly straight line trajectory by rotating at least one load carrying wheel in frictional engagement with the surface, angular rotation data of at least one wheel is obtained, absolute position data are obtained at different predetermined fixed positions $P_n$ of the vehicle with respect to the surface along the straight line trajectory, whereby the following steps are performed:
  a. at two different predetermined positions $P_n$ and $P_{n+1}$ of the vehicle with respect to the surface, corresponding passage of the vehicle and angular rotation data of the vehicle wheel are recorded and
  b. a conversion factor $\beta$ is calculated which determines the displacement of the vehicle obtained by a predetermined fixed angular shift or rotation of the at least one wheel between positions $P_n$ and $P_{n+1}$ and
  c. during further movement of the vehicle the current position of the vehicle is predicted based on the value of the conversion factor $\beta$, measured angular shift of the at least one wheel and recorded absolute location coordinates at position $P_{n+1}$,
  d. the load is increased, decreased, or shifts position with respect to the gravitational center of the vehicle and
  e. points a, b and c are repeated at the passage of each further predetermined position P.

Hereby it is assured, that any shift in load between consecutive absolute position readings of the vehicle is reflected in the predictions of vehicle position based on measured shift in angular position or speed, when the vehicle moves forward.

The method further allows the position of the vehicle with respect to the surface to be determined several times due to vehicle positions being determined with respect to one surface position and at least two different spaced apart locations on the vehicle. Especially the locations on the vehicle are spaced apart in the direction of movement of the vehicle so that the vehicle may be moved a well-defined distance between two consecutive absolute position readings.

In a further embodiment, the method prescribes one vehicle reader and a number of predetermined fixed surface points for recording vehicle positions.

In a further embodiment, the predetermined surface locations are initially mapped out and provided with RFID transmitter/receiver devices. And further the vehicle is provided with first and second RFID reader devices. These RFID systems combined with rotary encoders, which provide information on angular shift of the wheels, allows a safe and precise determination of the vehicle position during combined operations such as load changes and motion.

The above method may be carried out by a system, which comprises a self-propelled, self-guided wheeled vehicle adapted to drive along a surface where the vehicle has a load bay, a movable on- and/or off-loading arm, at least one load carrying driven wheel in frictional engagement with the surface for propelling the vehicle, whereby the vehicle also comprises a sensor adapted to collect angular rotation data with respect to at least one load carrying wheel, the system further comprising a predetermined track with at least one straight line trajectory having one or more mapped out locations $S_m$ along the length of the straight line trajectory provided with readable tags. Further, the vehicle comprises two fixed frame locations $L_1$ and $L_2$ spaced apart in the direction of movement, the fixed frame locations $L_1$ and $L_2$ comprises tag reader devices, whereby an on board computing device comprise means for receiving and storing tag information identifying two absolute positions $P_n$ and $P_{n+1}$ of the vehicle with respect to the surface.

With this system, the spaced apart tag readers may ensure that each readable tag is read with the vehicle in two different positions, whereby the travelled distance between the two positions will be the exact distance between the tag reader devices. It is suggested in an embodiment that the tags are RFID tags, and the tag reader devices are RFID readers.

Such a system may include that the computing device is adapted to calculate absolute distances between two consecutive absolute positions of the vehicle $P_n$ and $P_{n+1}$ as the location $L_1$ and $L_2$ passes a readable tag and that the on board computing device is adapted to calculate a conversion factor β which determines the displacement of the vehicle obtained by a predetermined fixed angular shift of the at least one wheel, and adapted to further calculate the current position based on the latest obtained absolute position $P_{n+1}$ and corresponding conversion factor β and angular rotation data.

The delivery and pick up system may further be defined in that the load comprises animal fodder, and the straight line trajectory passes along an array of animal feeding stations $F_1$ through $F_n$, and that the delivery system is adapted to deliver a predetermined portion of fodder at each feeding station. The mapped out locations $S_m$ are provided with corresponding RFID tags with respect to a number of preselected feeding stations, and the onboard computing means is adapted to calculate the change in conversion factor β between a mapped out location $S_{m+1}$ and a previous passed mapped out location $S_m$ this change in conversion factor designating a calculated load change $\Delta L_0$, such that the on-board computing device is adapted to calculate the load change based on the total mass of animal fodder intended to be delivered at feeding stations between $S_m$ and $S_{m+1}$ and corresponding load change $\Delta L$ whereby the onboard computing device is adapted to report a state of error whenever the numeric value of the difference between $\Delta L_0$ and $\Delta L$ is above a predefined value.

A program for on-board computing device to a delivery or pick up system according to the above is also provided.

Further, an on-board computing device for a delivery and pick up system as described with such a program is provided.

BRIEF DESCRIPTION OF THE DRAWINGS

The invention shall be explained in the following with reference to the figures in which.

DETAILED DESCRIPTION OF THE INVENTION

Figure 1:
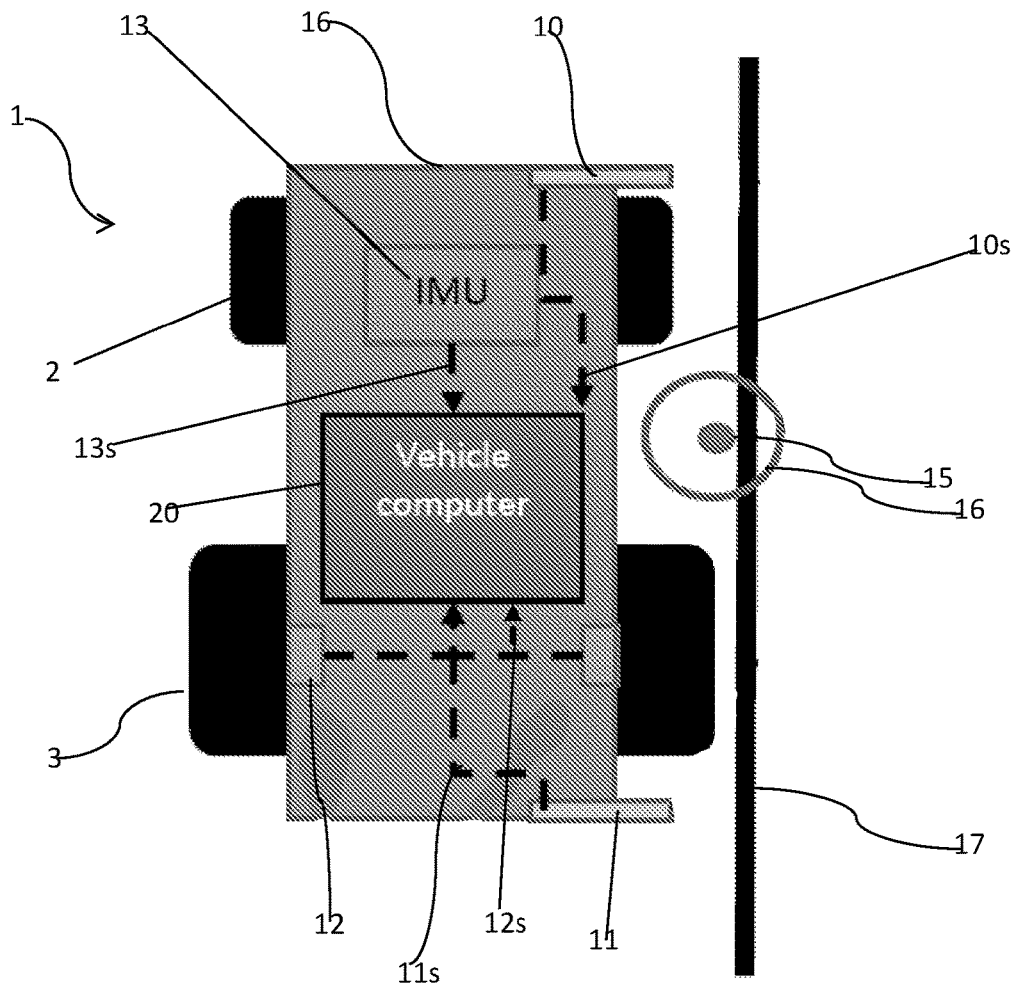
FIG. 1 shows a schematic view of a wheeled vehicle with means for obtaining positioning data.
Figure 2:
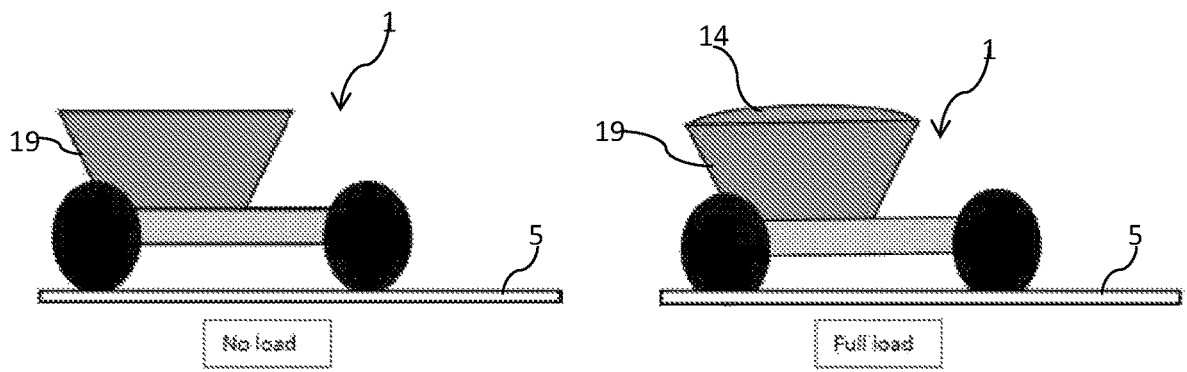
FIG. 2 shows, in schematic form, the changes of the wheels of a wheeled vehicle with pneumatic wheels with and without load.

In FIG. 1 a schematic view of a selfpropelled vehicle 1 is shown. A Load 14 on such a vehicle 1 is shown in FIG. 2. By usual means such as an electromotor and an on-board battery (not shown) the vehicle 1 is caused to move along a ground surface 5 shown in FIG. 2. It moves substantially along a straight line trajectory 17, and in order to do this, on board steering means are also provided (not shown in the figures). The steering means are not described in any further detail.

Sensor data relating to position from all on-board sensors are forwarded to a central computer 20 to be fused together to provide a better estimate of the current position P of the vehicle 1. The following inputs are described: RFID readers 10, 11; wheel rotary encoders 12; IMU 13.

Figure 3:
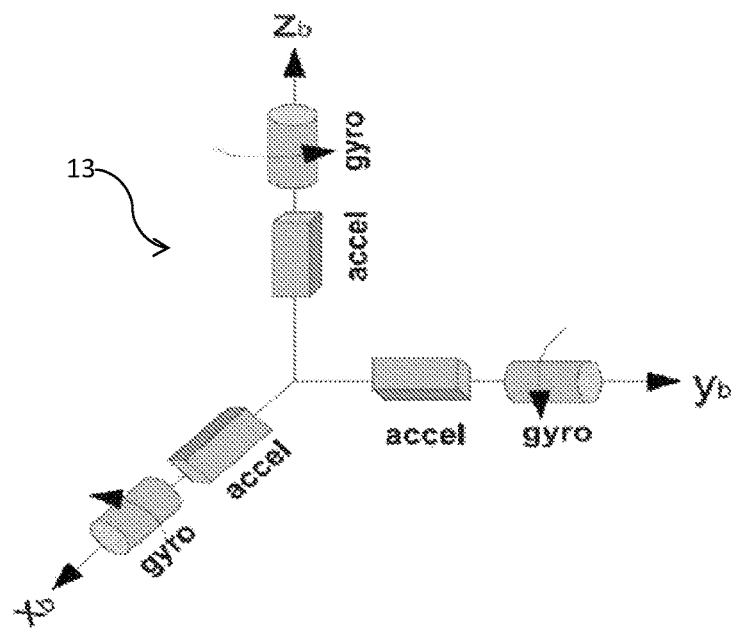
FIG. 3 shows in schematic form the sensors inside an IMU.

An IMU 13 is used to measure acceleration and rotational speed of the object to which it is attached, here the vehicle 1. As the starting position and orientations are known, the measurements from the IMU 13s feeds into the on board computer 20 and are used to estimate the pose, by use of numeric integration. The measurements are provide along all the 3-axis in 3D space, providing for all 6 degrees of freedom (DOF) as seen below in FIG. 3, with accelerometers and gyro's indicated.

An IMU 13 normally provides data at high update rate, which is an advantage over other sensors used for orientation. Compared to wheel encoders which has a slip from ground problem, the IMU 13 provides correct data continuously since all its measurements are global. The disadvantage of using IMU's for localization it that they suffer from accumulated errors. Since the measured values are integrated onto its previously-calculated positions, any measurements errors are accumulated from measurement to measurement. The accumulated errors can lead to drift or even produce a totally inaccurate estimate of the actual location.

The vehicle 1 is disclosed with four pneumatic wheels, and has a pair of smaller wheels 2 and a set of larger wheels 3. The smaller wheel pair may be used for steering, whereas the larger pair are used to propel the vehicle forward, in that this wheel pair 3 is driven by an engine, such as an electro motor or combustion motor (not shown in the drawing). Connected to the drive of the larger pair of wheels 3 is also a tachometer or the like 12, which may register wheel angular position and/or change of angular position or angular speed of the wheel. In any case a signal 12s from this meter 12 is fed into the computer 20 and corresponding time and angular data from the wheels 3 are stored.

The number of wheels may differ from the four wheels shown in the example, and may comprise 3, 5, 6 or even more wheels.

A wheel rotary encoder (wheel odometry) 12 provides a means to estimate vehicle change in position over time. Encoders on the driving vehicle wheels 3 are used to estimate both speed V of the vehicle and rotational speed of the wheel 3.

The system according to the embodiment of FIG. 1 is envisioned to have two or more tag readers of the same or different types. Both readers must be able to read the same tag. A tag could for example both contain a bar-code string and RFID information, making it possible to utilize a combination of different tag readers.

As seen in FIG. 2 the wheels may change shape such that they are not exactly round, when the load bay 19 of the vehicle comprises a load 14. Thus the connection between travelled distance and angular displacement of a load carrying wheel 3 changes with respect to the weight and position of the load 14. The vehicle transports a varying load that impacts the steering and operational performance. When a wheel rotary encoder is used to estimate travelled distance, one normally assumes a priori known effective radius of the wheel. By measuring the number of wheel-rotations using the rotary encoder the vehicle computer can provide an estimate of the travelled distance. When operating with a load transporting vehicle the effective rotational radius will change dependent on the current load transported. This make is relevant to provide a means to estimate wheel parameters. It should also be mentioned, that the driven wheels 3 rely on friction for propelling the vehicle 1 forward, and thus slippage may take place. This cannot be readily observed by the meter 12, and thus slippage between wheel 3 and surface 5 may further mis-align travelled distance with measured angular shift of the driven wheel 3. According to the disclosed example, the standard system utilizes pneumatic tires for wheels, but other tire solution could be used. A pneumatic tire is pumped with air (or similar gas) to a chosen pressure making it somewhat flexible in shape. The tire-shape and surface-grip will change when different forces are applied to a pneumatic tire. The transported load has an effect on the normal force pressing the vehicle down towards the ground. According to the disclosed example the vehicle is transporting a max load in the range of 50 kg. to 10000 kg. Higher loads could be transported, but it is not expected to be part of the standard usage. Another way to define the transport load limits, in the envisioned invention, is as a percentage of vehicle weight, and here it is expected to dimension load capability from 10% of vehicle weight and up.

Two tag readers, e.g. RFID tag readers 10, 11 with known mounting location on the vehicle are shown in FIG. 1. Each is to read the respective tags 15 that the vehicle 1 passes by in movement. The tag readers 10, 11 must be mounted on a rigid vehicle body part such as a frame part 16. Usually tags are embedded in surface 5, but they may as well be embedded in or attached to other structures such as ceilings, animal cages or the like.

A multitude of RFID tags 15 may be positioned along a straight path or straight line trajectory 17.

Two DOF or higher IMU 13, which are able to measure vehicle acceleration and rotation speed, and estimate orientation in relation to center of earth may be provided.

A computer 20 mounted on the vehicle 1, receives the RFID tag information, the tachometer readings through feed line 12$s$, plus possibly IMU date through feed line 13$s$ and encodes this sensory and possibly further sensory data, to compute the absolute vehicle position on the surface 5 on which the vehicle 1 travels. Here it is assumed that an absolute tag map is available, and that each tag 15 is unique, such that when the vehicle on board computer 20 receives the information from the foremost RFID reader 10, it may retrieve the absolute position $P_n$ of tag reader 10, and when at a later point in time it receives the information from rearmost RFID tag reader 11 it may then retrieve the absolute position $P_{n+1}$ of tag reader 11. As the two tag readers 10,11 are placed with a fixed and known distance apart from each other in the direction of travel, the computer may calculate a precise distance travelled from $P_n$ to $P_{n+1}$ and an average speed of the vehicle 1 during passage of RFID tag 15 by readers 10 and 11. The locations with respect to the vehicle 1 of RFID reader 10 may be termed $L_1$ and the location of RFID reader 11 may be termed $L_2$. More tag readers could be provided on frame 16.

During this passage, also the computer 20 receives data from the tracking of the angular position shift of the wheel pair 3. As the distance travelled is now known, it is possible to relate this distance to the angular shifts of the wheel pair 3 by computing a conversion factor β which directly links angular shift of the wheel pair with travelled distance. Further, at the passage of the RFID reader 11 past the RFID tag 15, precise information of the position of the vehicle is gained, and based on this information, the current angular shift of the wheel, and the conversion factor β, the position of the vehicle 1 may be calculated while it moves forward.

The load may however change during movement, and it is thus necessary to have RFID tags at regular intervals, in case a precise prediction of the whereabouts of the vehicle 1 is needed.

In a number of instances the data from the IMU 13 could be left out of the solution. IMU data could be left out where the surface is flat and even and the main intend is to calibrate data from the wheel rotary encoder as just explained. In cases where the IMU is left out, the system ground unevenness and load effects are not directly measurable.

The system can be extended with other localisation capabilities like ultra sound; doubler radar; laser range scanner; camera vision; and other line-of-sight sensors. Such sensor inputs could be used to determine the position of the vehicle 1 at regular intervals either as substitute for the RFID tag system or as a supplement thereto. These line-of-sight sensors could measure the distance to the tags and improve the position estimate each tag provides. This is especially important for the RFID tag positioning system, as the RFID reader receives a positive response from an RFID tag once the two are within reading distance of each other. This distance determines a window of positive indication, however the tag reader cannot determine how far away and in what direction the tag is actually placed, once the reader is within the window. The supplementary positioning system may help in gaining this information.

During motion from one RFID tag to the next, the vehicle 1 may shift its load 14 receive more load or load off and become lighter, and in each case, a new conversion factor β is to be calculated. Thus it is preferred that at each passage of an RFID tag, the vehicle on board computer 20 performs a new calculation of the conversion factor β based on the latest measured absolute distance and angular shift of a wheel 3.

Figure 4:
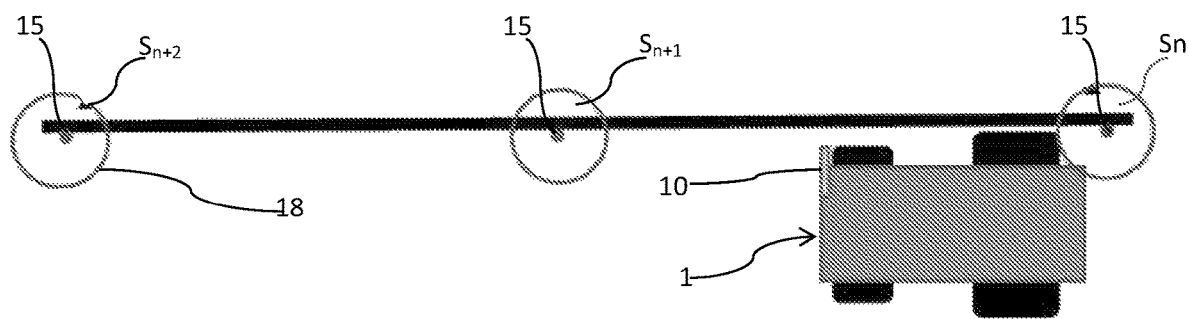
FIG. 4 shows a schematic view of a vehicle with only one RFID reader and a track with a range of RFID tags.

As seen in FIG. 4 the vehicle 1 may use only one of RFID tag readers 10,11 but in this case passage past two fixed locations $S_n$ and $S_{n+1}$ with tags is required in order to update the on board computer 20 with respect to conversion factor 3. Thus more locations with tags are required in order to obtain the same update rate for β, or for a fixed distance between locations L the number of tag readings may be increased by having more readers on the vehicle 1.

The vehicle parameters can be used to improve both automatic vehicles guidance and load placement in surroundings. A load placement could be open loop, meaning that the on-board computer 20 will not get any feedback on load placement. Over timer the on-board load should be changing, but blocking of the load output could occur as well as other disturbances in on-loading actions. The sensor combination could be used to detect problems in the load output and utilize the information to either warn an operator or stop the current operation automatically, thus providing a closed loop load placement, whereby positive feedback on deliveries is obtained. This may be set up to work in the following way:

The β value change from one RFID passage to the next, is actually an estimate of load change $\Delta L_O$ occurred between the two RFID positions. The on board computer 20 may also gain information on load changes from other sources, such as by counting delivered items or portions of material, or possible by measuring out the weight of delivered material. This load change may be termed $L_O$. The on board computer 20 may now compare these two values, and in case their difference is two high, a state of malfunction or error may be reported. This condition may be indicative of on-loading or off-loading not taking place as expected.

It would be a simple matter to calculate vehicle average speed between consecutive RFID measurements and this information may contribute to the on board computer data sets acquired during passage and can be useful in guiding the vehicle and prevent such problems as speeding. This is especially important in areas where humans are present in the vicinity of the vehicle, as in such areas there are speed limit to be observed by self-guided vehicles for safety reasons.

Preferably the information gained on vehicle movement is used to calculate the next RFID tag passage, and when the vehicle tag reader 10 is supposedly at the predicted tag, and no RFID signal is received, it may report and store a state of malfunction. Depending on the actual lay out of the system such a malfunction may or may not cause the vehicle to stop working. Possible it is caused by a non-functioning RFID tag, or reader, and in case more readers are available on the vehicle 1, forward motion to the next RFID tag may be safe to perform.

However, in a situation where many consecutive runs along the same lane are performed, the data on non-functioning items such as RFID tag or reader may be stored in the system and reported to service-workers, in order that the non-functioning items be replaced.

In some environments such as in animal stables for husbandry or zoo gardens, dirt and other spills may soil the surface, and at some point this may become a problem to the vehicle. However, by means of detection of vehicle and RFID parameters such as described above, this may be detected and reported timely to service workers.

In short this means that:
Online vehicle parameter estimates can be used to improve the localisation data received from the relative sensors encoder and IMU.
Better sensor data from the relative sensor, can be used to increase the distance between tags like RFIDs. By increasing the distance between the tags, the number of tags needed to cover the same area can be diminished, resulting in less costly tag setup.
Each tag has the possibility to be read by more tag readers on each vehicle, this in itself increases the number of position updates using the same number of tags.

As mentioned, the time between the RFID reader's passages of the same tag, can be used as a speed estimate source. Compared with IMU and encoders, RFID reader speed measurement is not based on a derived measurement in terms of wheel rotational speed or measured acceleration by the IMU. The precision of the speed estimate may have a direct influence on the precision of on-loading and off-loading actions, since many systems have a reaction time; that is a time delay from a load action signal is produced to the actual load action takes place. This time delay must be taken into account, as the vehicle will move during this time, and dependent on the actual speed the displacement will vary. Possibly this displacement is calculated from an actual measured speed of the vehicle and the load action signal is produced earlier in time, to assure that the load action is performed at the right vehicle position.

Figure 5:
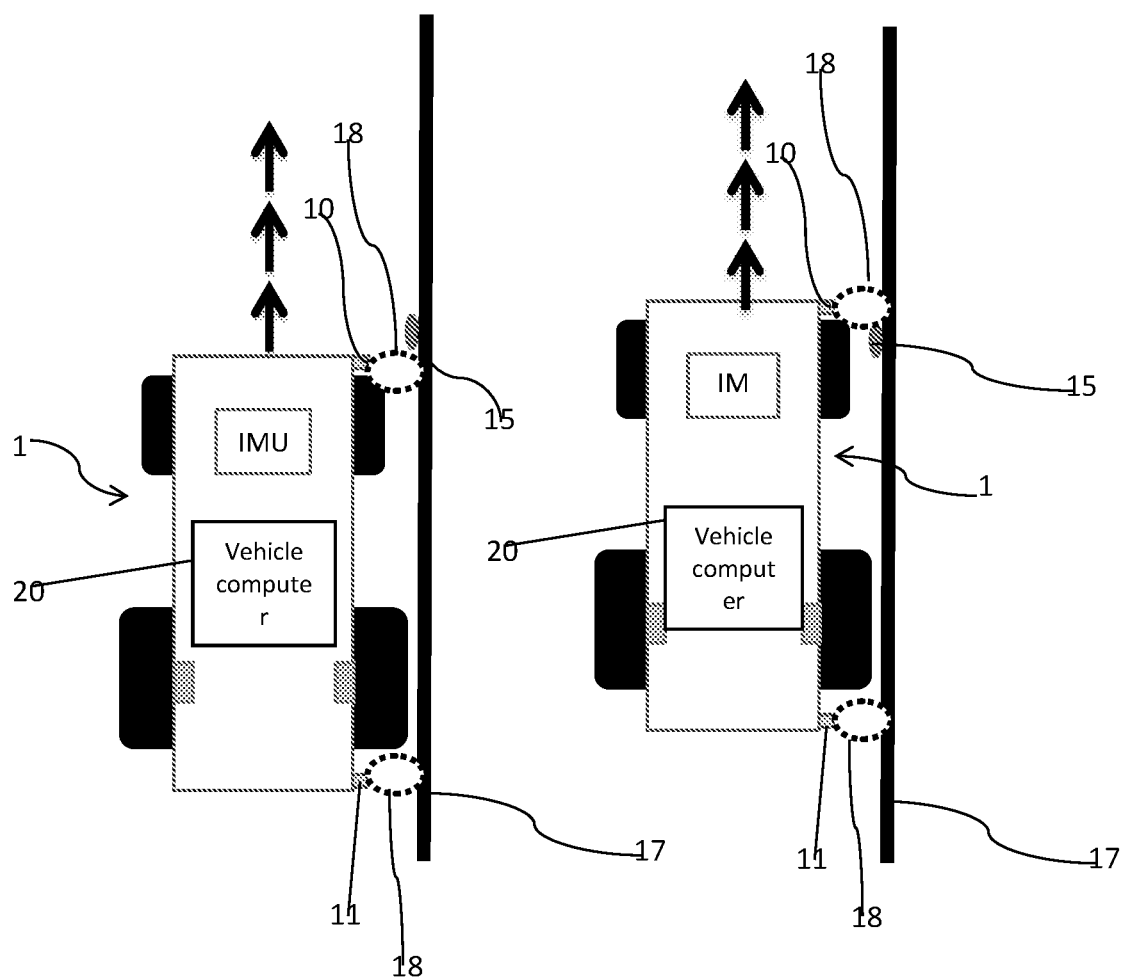
FIG. 5 shows in the right hand side a vehicle with the RFID tag reader leaving a detection zone, and in the left hand side the tag reader is entering a detection zone, FIG. 6 a diagram over the main functional parts of the software used in determining the position of the vehicle 1.

FIG. 5 is an example of the tag detection using RFID. The RFID readers 10, 11 have a zone 18 within which it is able to receive identification information from a tag 15 such as the ID number. This zone 18 is also displayed in FIG. 1. The vehicle computer 20 receives the RFID reader information at specific time periodic interval such as by reading rates of 10 Hz or 100 Hz. When no tag is inside the readers receiving range, or the zone 18 the reader either transmits no data; tag misreading or no tag in range. When the reader 10,11 get within the zone 18 where it is able to detect a tag, a reader event is logged by the computer and time stamped. This corresponds to the situation displayed in the left hand side of the figure.

The next event occurs when the tag-reader moves outside the tags detection zone 18, which is shown at the right hand side of the figure, were the vehicle has moved forward in the direction of the arrow.

Both events can be defined as specific events in time and used as time interval references when both readers 10,11 have passed the tag 15. The edges of the tag-readers receiving zone 18 can be seen or perceived as points on the vehicle in the lateral direction. RFID tag readers will provide updates in specific time intervals, such as at a 10 Hz or 100 Hz rate. When a bar-code, QR or visual tag-reader is utilized the principle remains the same in terms of detection edges, even though the readers have different types of receiving zones, such as cone shaped for the bar-code reader and oval/circular for the RFID tag reader.

Calculation example:
Encoder:
4096 count pr. revolution (tick pr. rev)
(meaning 1 count equals 360 (degree)/4096=0.0878 degree)
Distance between reader events: 2 m
Time between events 8.1 seconds
Sample rate 20 Hz
Counted ticks: 4200
(calculated by summing all the sample difference in position together)
Average Ticks pr. second: 520
Estimated Effective Radius Calculations:

$$R\_ee\_1 = 2*pi*(O/L) = (2*pi*(4200 \text{ ticks}/4096 \text{ ticks}))/(2 \text{ m}) = 0.310 \text{ m}$$

$$R\_ee\_2 = V\_average/w\_average = \text{speed/rotational speed} = ((2 \text{ m})/(7.8 \text{ s}))/((520 \text{ tick/s})*(2*pi/4096 \text{ ticks})) = 0.309 \text{m}$$

One can choose to use one or the other version or take the average of the values.

The above case is for a single encoder on a flat surface. If two encoders are available as depicted above one calculates average the value for each sample. Based on the estimated effective radius, Hooks law can be used to determine current transport load on the tires with encoders.

$$Fn\_load = k*x, \text{ where } x \text{ represents difference current between effective radius and effective radius without any load.}$$

Based on tire characteristic one can also estimate current grip surface area. In the cases where rotational speed of the tire is increasing or decreasing over time, one can use the two measurements (time and ticks) in a least square method to estimate current wheel slip on the surface.

Either least squares estimation method or direct calculation should be used when vehicle only will pass a single tag.

When multiple tags are passed when the vehicle is moving along a straight path kalman filtering or least squares should be used. Both least square and kalman utilizes the weight of multi measurement to provide a more accurate parameter estimate.

Figure 6:
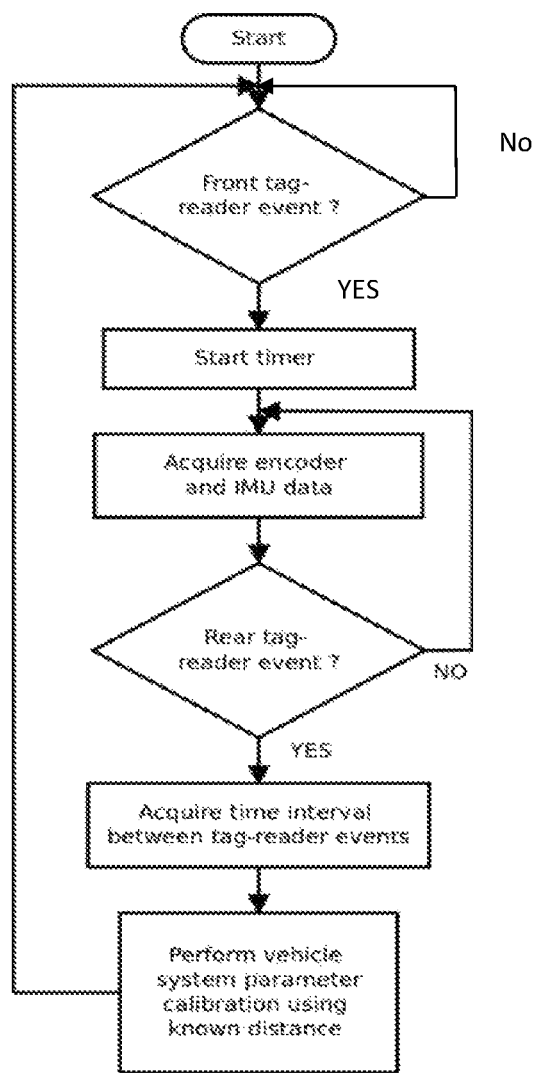

When the vehicle has passed a single tag it will in total produce four measurable distance estimates and time intervals. In the most basic form the method can be illustrated using word flow diagram in FIG. 6.

In terms of the vehicles movement direction we denote the two readers, front tag reader unit 10 and rear tag-reader unit 11. The movement direction determines when to start the parameter estimation procedure. The procedure commences by checking "Front tag-reader event?" and in case the front RFID tag reader is active, a "Start Timer" activates. Until the expected event has been triggered on the rear tag reader, the computer continues to log data from encoders and IMU according to the "Acquire encoder and IMU data" process. Once the rear tag reader 11 has acquired data from a tag passage according to the "Rear tag-reader event?" check, the "Acquire time interval between tag-reader events" sequence is activated. Once this sequence is finalized, the "perform vehicle system parameter calibration using known distance" may be performed. Here the connection between travelled distance and wheel rotation measurements is established and will be used until the next distance measurement based on reader and tag locations is performed.

Multiple methods can be used to estimate the relevant parameters related to the vehicle. Below is mentioned a number of these methods (but not limited to):
  Direct calculation for single sample
  Least squares estimation
  Kalman filtering methods
    Standard Kalman filter
    Extended Kalman filtering
    Unscented Kalman filtering
  Adaptive learning methods
    Neural networks
    B-spline networks
To give an example for direct calculation:
Encoder: 4096 count pr. revolution (tick pr. rev) (meaning 1 count equals 360 (degree)/4096=0.0878 degree)
Distance between reader events: 2 m Either least squares estimation method or direct calculation should be used when vehicle only will pass a single tag. When multiple tags are passed when the vehicle is moving along a straight path Kalman filtering or least squares should be used. Both least square and Kalman utilizes the weight of multi measurement to provide a more accurate parameter estimate.

Adaptive learning methods can be used to include a priori information training information.

Figure 7:
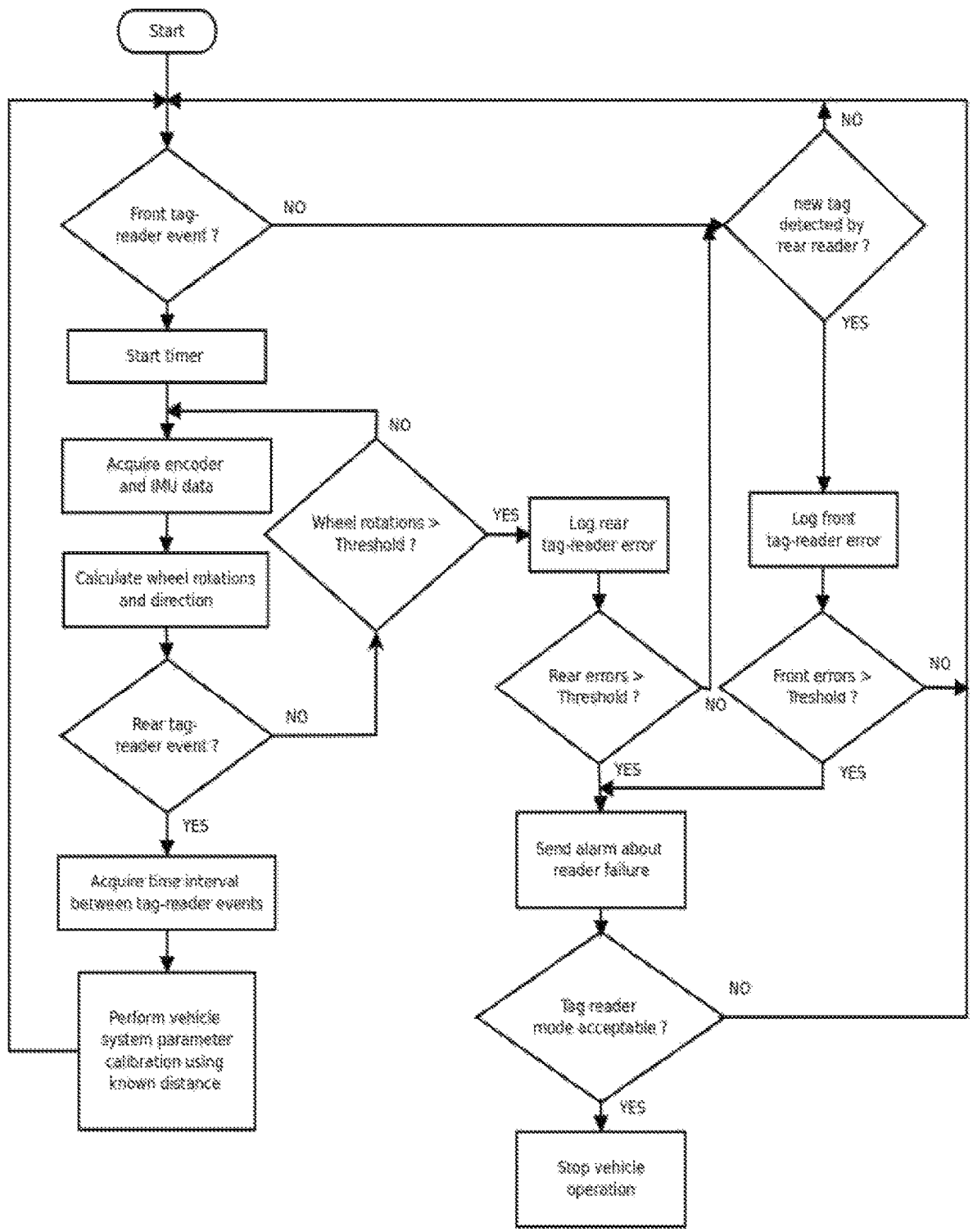
FIG. 7 shows a more comprehensive diagram of functional software parts within the onboard computer.

In FIG. 7 the procedure for detecting tag error or tag reader error is included in the diagram. The logic of this diagram is embedded in the on board computer, and it ensures that the vehicle is stopped if tag reader modes are not acceptable and that as long as this is not the case, the latest known travelled distance measured by the tag and tag-reader devices is used in determining the present position of the vehicle.

If the "Front tag-reader event?" question is negated, the polling is not just performed again, but a sequence of error finding is initiated by the "new tag detected by rear reader?" question. If the rear RFID tag reader 11 is activated unexpectedly by a new tag this could be down to an error on the front RFID tag reader 10 and thus this case needs to be examined, and the YES line out of this decision box leads to a series of actions adapted to establish if an error is at hand. A counter "Log front tag-reader error" firstly counts up such errors. If "Front errors>Threshold?" is negated, it is taken as an indication, that no reader error is at hand, however if affirmed, it is determined, that the front RFID reader is possibly out of order, and both front and rear tag readers are checked in the "Tag reader modeacceptable?" check. If the reader mode is acceptable, it can be concluded that one or both tag readers are not really working and the "Stop vehicle operation" action is performed. If the tag reader modes are somehow not acceptable, a reset or other corrective action may be performed, and the vehicle may continue operation.

The "Log rear tag-reader error" is operated when a front tag reader event is not followed within an expected threshold of wheel rotation by a "Rear tag-reader event". This is examined by the "Wheel rotations>Threshold?" check. If the wheel has rotated too far, a "Log rear tag-reader error" event is initiated, and in case "Rear errors>Threshold" is affirmed the "Send alarm about reader failure" is initiated as explained above. In case the threshold of rear errors is not met, the "New tag detected by rear reader?" is checked as explained above.

Figure 8:
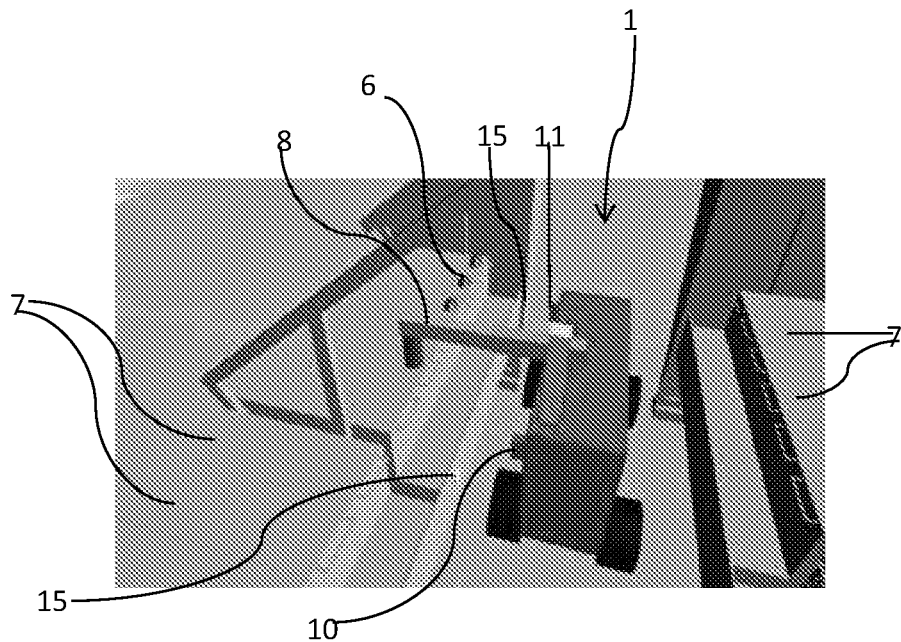
FIG. 8 shows vehicle inside a building housing animal cages.

FIG. 8 shows a vehicle 1 in the process of doling out portions of animal fodder 6 on top of animal cages 7, by way of an automatic fodder arm 8, which may shift position by way of pivotal or telescopic movement. This motion of the fodder arm 8 as well as the placement of fodder causes weight shifts and this again changes the pressure distribution on the tires, which again changes the motion of the vehicle with regards to angular shift of driven wheels. The animal cages 7 are provided in rows and usually there is roofing over the cages to keep the animals comfortable. When driving under the roofing, the vehicle 1 must rely on IMU and readings of pre-arranged tangs for orientation. In the figure the roofing is left out to improve the view of other elements. Thus on the sides of the animal cages 7 RFID tags (or other readable tags) are provided. And on the vehicle frame corresponding readers 10, 11 are provided. As previously explained, this arrangement allows the vehicle to keep track of its position, and thus the animal fodder 6 may be correctly placed on top of each cage 7. It is also possible to dole out metered portions to each animal, as now the vehicle onboard computer may actually calculate which animal cage each portion will arrive at. This would only require the fodder arm to be able to dole out individually metered portions. Also medications or vitamins may be added to the fodder on an individual animal cage basis for treatment of various conditions. The presented graphics of FIGS. 8, 9 and 10 relates to mink husbandry where mink fodder is placed directly on top of the animal cages. The cages are made from wire mesh and the animals may easily take the fodder through the top mesh of the cage as the fodder is mixed and processed into a pasty like substance. However, other kinds of animal husbandry may use similar systems.

Figure 9:
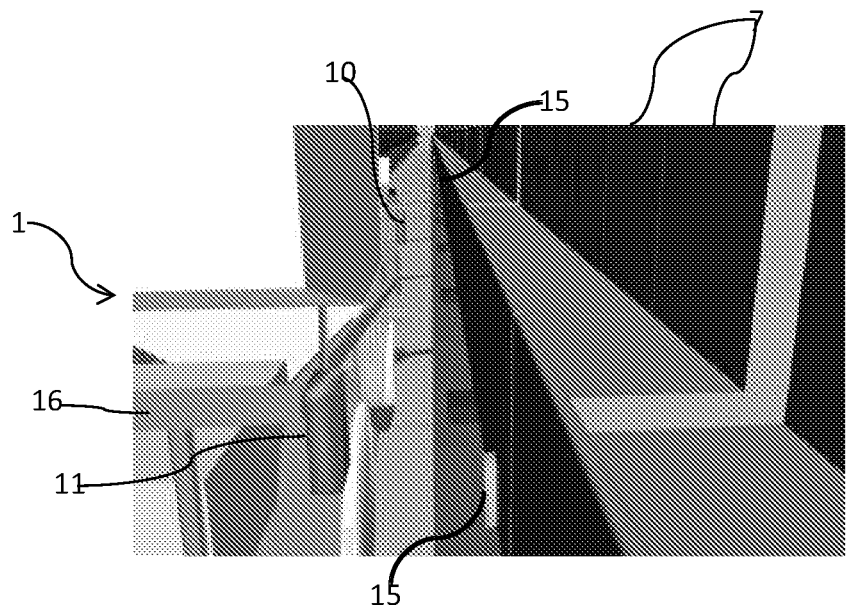
FIG. 9 is a different angle of view of essentially the same situation as shown in FIG. 8

FIG. 9 shows a computer-generated view along the aisle of animal cages 7 arranged above ground 5 and with RFID or similar tags 15 arranged on the vertical front thereof at regular intervals. The tag readers 10, 11 on the vehicle 1, mounted to the frame 16 are schematically indicated on the figure, and they are naturally provided at the same level above ground as the tags 15 on the cages. The tags may in real life be quite flat and when mounted sit flush with the surface of the animal cages in order that they are not inadvertently knocked off the cage front by the vehicle or persons passing along the animal cages. A tag will always be provided at the foremost cage in a row, so that the vehicle when starting its passage along the cages may calibrate its position from the start to ensure that it knows where to start doling out fodder.

Figure 10:
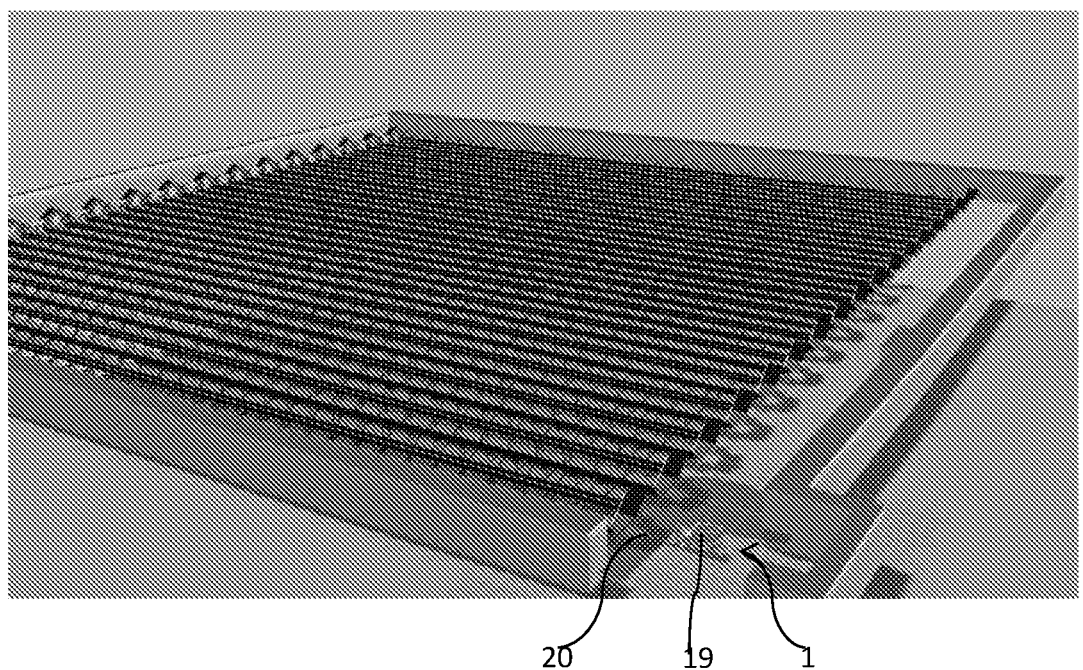
FIG. 10 shows a comprehensive view of animal sheds such as for mink.

In FIG. 10 an overview of a mink farm is disclosed. Here 18 double rows of cages are disclosed. The vehicle 1 is about to enter along the aisle between two rows in order to deliver the animal fodder, presently loaded onto the load bay 19. An area 20 in front of and to the side of the vehicle is scanned by a well-known laser scanner, in order that the vehicle may deviate from a planned course in case un-foreseen obstacle should show up in its path. Such lacer scanners are also known under the names of Lidar-scanner or Laser measurement system. The entire arrangement allows automatic feeding of the animals with a minimum of labor force being occupied.

A vehicle for feeding mink is provided with a system that could utilize this invention. Both fully automated versions and version driven by a human driver with automatic feeding could benefit from this invention. Each mink cage would get a portion of fodder in the range of 80-300 grams, based on mink gender; age; number and race. The farmer chooses the amount of fodder each cage gets based above criteria and personal experience. With fodder tank load-range in the order of 500-2500 kilo gram, a machine would be able to feed a range of cage units from 1500 to 30000 units. Each feeding position is normally in the range 0.27-0.4 m (0.33 m standard in Denmark for standard unit). Therefor the feeding must be placed within a narrow position range of plus/minus 0.10-15 m. Placing the fodder at these specific requires a localization system on-board the vehicle able to determine current position in relation to the surroundings.

USED NAMES AND CORRESPONDING REFERENCE SIGNS 1 vehicle,
2 smaller set of wheels or steering wheels,
3 larger set of wheels or driven wheels,
5 surface
6 Portions of animal fodder,
7 Animal cages
8 Automatic fodder arm,
10 RFID tag reader
10s RFID tag reader signal
11 RFID tag reader
11s RFID tag reader signal,
12 tachometer or angular change sensor 12s angular data feed line,
13 IMU
13s IMU signal feed line,
14 Load
15 RFID tag
16 fixed frame
17 straight line tradjectory
18 detection zone
19 Load bay
20 scanned area

The invention claimed is:

1. A method for recording and predicting position data for a self-propelled wheeled vehicle carrying a load of animal fodder whereby the vehicle is caused to move along a ground surface and caused to dole out portions of animal fodder from a load bay along a predominantly straight line trajectory and caused to move by rotating at least one load carrying wheel in frictional engagement with the surface, angular rotation data of at least one wheel is obtained, absolute position data are obtained at different predetermined fixed positions $P_n$ of the vehicle with respect to the surface along the straight line trajectory, whereby the following steps are performed:

a. at two different absolute positions $P_n$ and $P_{n+1}$ of the vehicle with respect to the surface, corresponding passage of the vehicle and angular rotation data of the vehicle wheel are recorded and b. a value of a conversion factor $\beta$ is calculated which determines a displacement of the vehicle obtained by a predetermined fixed angular shift or rotation of the at least one wheel between absolute positions $P_n$ and $P_{n+1}$ of the vehicle and c. during further movement of the vehicle a current position of the vehicle is predicted based on the value of the conversion factor $\beta$, measured angular shift of the at least one wheel and recorded absolute location coordinates at absolute position $P_{n+1}$, d. decreasing the load of animal fodder, or shifting position of the load of animal fodder with respect to a gravitational center of the vehicle whereby said decrease or shift in position of the load of animal fodder causes the at least one wheel to deform and e. points a, b and c are repeated at the passage of each further predetermined fixed position P of the vehicle.

2. The method for recording and predicting position data for a self-propelled wheeled vehicle according to claim 1, whereby absolute positions $P_n$ and $P_{n+1}$ of the vehicle are each recorded with respect to a surface location $S_m$ and with respect to one first location $L_1$ and one further location $L_2$ on a fixed frame of the vehicle whereby $L_1$ and $L_2$ are spaced apart in a direction of movement of the vehicle when the vehicle is caused to move along the straight line trajectory.

3. The method according to claim 2, whereby each surface location is initially mapped out and provided with a RFID transciever device, and whereby the locations $L_1$ and $L_2$ on the vehicle are fitted with RFID reader devices.

4. The method according to claim 3, whereby the current position of the vehicle as predicted and used to calculate a distance to a closest surface location comprising a RFID transceiver device, and in case a predicted distance is smaller than a predefined minimum distance and no RFID signal is obtained, a state of malfunction is reported and stored.

5. The method according to claim 4, whereby stored states of malfunction relating to RFID device locations are processed in order to diagnose non function of RFID tags as well as non-function of RFID reader.

6. The method for recording and predicting position data for a self-propelled vehicle according to claim 1, whereby the absolute positions of the vehicle $P_n$ and $P_{n+1}$ are determined between a first location $L_1$ on the vehicle and a first surface location $S_m$ and a second surface location $S_{m+1}$.

7. The method according to claim 1, whereby further devices for detecting and recording position and rotational changes are provided on board the vehicle and that at each time absolute position data are recorded using RFID or other tags, a position change data recording means are reset.

8. The method according to claim 1, whereby a load change value $\Delta L$ is predicted based on preprogrammed delivery or reception of load, and a load change value $\Delta L_0$ is determined by the change of the value of the conversion factor $\beta$ which is calculated each time the points a, b and c are carried out and whereby further $\Delta L$ and $\Delta L_0$ are compared each time $\Delta L_0$ is determined, and that a state of malfunction is determined in case a numeric value of a difference between $\Delta L$ and $\Delta L_0$ is above a predetermined threshold value.

9. The method according to claim 1, whereby the animal fodder comprises mink fodder, and is initially loaded onto a load bay of the vehicle, and that the straight line trajectory passes along a range of animal feeding stations comprising mink cages, and that at each feeding station a predetermined portion of mink fodder is off-loaded from the vehicle.

\* \* \* \* \*